Figure 1:
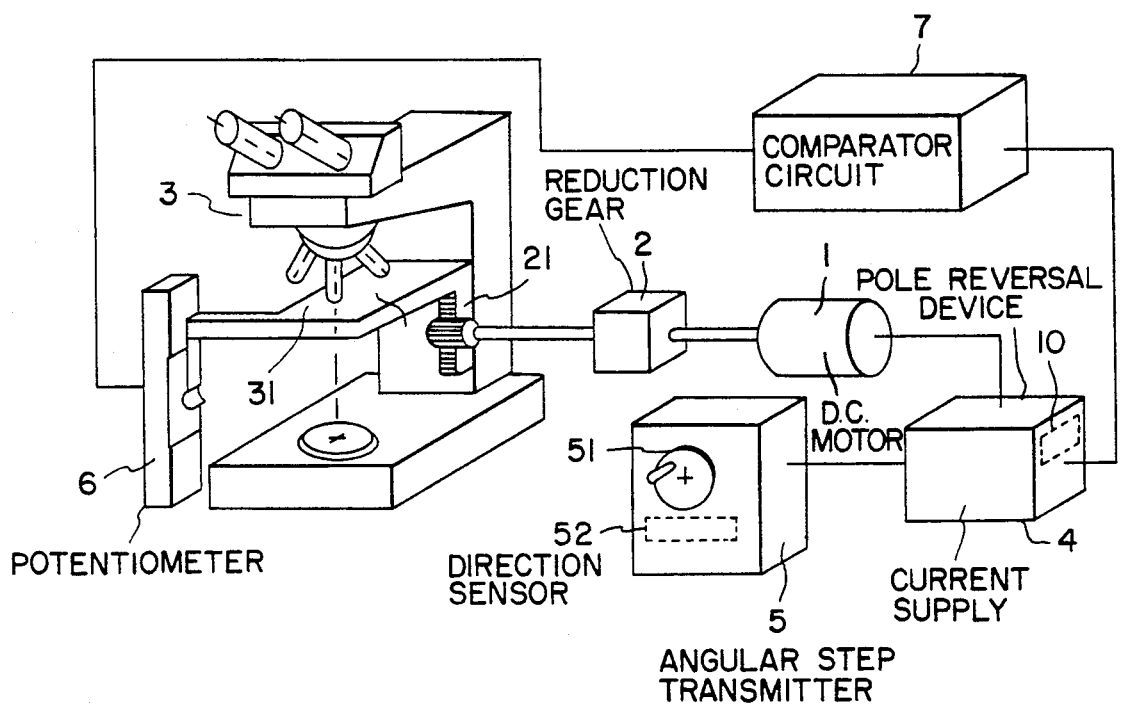

United States Patent [19]

Schalz

[11] Patent Number: 5,260,632
[45] Date of Patent: Nov. 9, 1993

[54] POSITION CONTROL SYSTEM

[75] Inventor: Karl-Josef Schalz, Im Kohlgarten, Fed. Rep. of Germany

[73] Assignee: Leica Mikroskopie und Systeme GmbH, Wetzlar, United Kingdom

[21] Appl. No.: 849,379
[22] PCT Filed: Aug. 31, 1991
[86] PCT No.: PCT/DE91/00691
    § 371 Date: May 6, 1992
    § 102(e) Date: May 6, 1992
[87] PCT Pub. No.: WO92/04666
    PCT Pub. Date: Mar. 19, 1992

[30] Foreign Application Priority Data

Sep. 6, 1990 [DE] Fed. Rep. of Germany ....... 4028241

[51] Int. Cl.$^5$ ................................. G05B 1/02
[52] U.S. Cl. ..................... 318/606; 318/280; 318/281; 318/291; 318/590; 318/369; 318/593; 318/362; 318/293; 318/599
[58] Field of Search ........... 318/280, 281, 291, 293, 318/590, 592, 593, 362, 364, 369, 606; 388/831

[56] References Cited

U.S. PATENT DOCUMENTS

| | | | |
|---|---|---|---|
| 3,681,620 | 8/1972 | Hoge | 307/271 |
| 3,742,333 | 6/1973 | Yurick | 321/45 |
| 4,504,158 | 3/1985 | Ciampi et al. | 318/593 |
| 4,624,537 | 11/1986 | Hanssen et al. | 350/531 |
| 4,675,589 | 6/1987 | Sausner et al. | 318/599 |
| 4,695,137 | 9/1987 | Joergens et al. | 350/521 |
| 4,717,865 | 1/1988 | Caputo | 318/362 |
| 4,816,726 | 3/1989 | Novis et al. | 318/293 |
| 4,937,509 | 6/1990 | Gundlach | 318/362 |
| 5,129,317 | 7/1992 | Gloe et al. | 318/369 |

FOREIGN PATENT DOCUMENTS 066159 12/1982 European Pat. Off. .

*Primary Examiner*—William M. Shoop, Jr.
*Assistant Examiner*—Karen Masih
*Attorney, Agent, or Firm*—Foley & Lardner

[57] ABSTRACT

A positioning control for linearly displacing an object (31) has a direct current motor (1) and a gear (2,21) for converting rotary into linear motion, a current supply (4) of current pulses having given frequency, amplitude and duration; a pole reverser; a rotatable operating element (51) coupled to an angular step generator (5) and a sensor of the sense of rotation. The pulse frequency of the current supply (4) is determined by the angular step generator (5) and the polarity of the pole changer is determined by the sensor of the sense of rotation. The characteristic curve of the speed of displacement of the object (31) as a function of the pulse frequency is kinked, in that for low pulse frequencies the speed increases proportionally slowly, and up from the level of a pulse frequency threshold, the speed increases markedly quicker. The invention is useful for microscope focussing drives.

14 Claims, 3 Drawing Sheets

POSITION CONTROL SYSTEM

The invention relates to a position control system having a direct current motor, a reduction gear and a current supply device for current pulses.

Such position control systems are known. Operation using current pulses permits extremely low mean rotational speeds of direct current motors.

DE-OS 3,330,476 discloses an arrangement for the control of a movement, especially of the object stage or of the focusing drive on a microscope. A handle with a proportional transmitter is provided, as well as a circuit which controls a motor as a function of the signals of the transmitter.

In order to combine coarse and fine drive in one system, it is provided that the circuit multiplies the transmitter signals by a factor dependent upon the transmitter speed and thus provides an overproportional dependence of the output speed upon the actuating speed. A stepping motor is provided as the motor.

Such a circuit is very costly. The dynamic range of a stepping motor, which is limited by the smallest rotary step and the greatest rotational speed with an uncomplicated pulse supply, is restricted as compared with that of a direct current motor.

From Reuter, E. "Carriage positioning in printers and plotters" DE-Z. Feinwerktechnik + Messtechnik 97 (1989), No. 10 pp. 443–446, it is known that "open loop" systems, which are in widespread use for precision positioning and which have a control loop from the motor (angle transmitter) to the input of the electronic drive system, fail to consider tolerances of following mechanical elements.

The object of the invention is to provide a position control system of the type described, which system is constructed using simple and inexpensive components, especially a simple electronic circuit, and in this case achieves a positioning movement with a large dynamic range from extremely small steps up to a high speed of displacement. Linear movement forward and backward is to be possible. Involvement in various automated functions and in controlled systems is to be possible.

In particular, the position control system is intended to be suitable for the focusing drive or the drive of the object stage of a microscope.

This object is achieved by a position control system having the features of the independent claims 1 or 5. The features of the subclaims 2 to 4 and 6 to 14 give advantageous further developments and refinements.

The invention is explained with reference to the drawing.

In the drawing:

FIG. 1 shows a general view of the arrangement of a position control system according to the invention, on a microscope

FIG. 2 a) shows the progression of the current pulses and of the positioning speed in qualitative terms for low pulse frequencies b) ditto for pulse frequencies above a threshold value c) ditto for high pulse frequencies

Figure 3A:
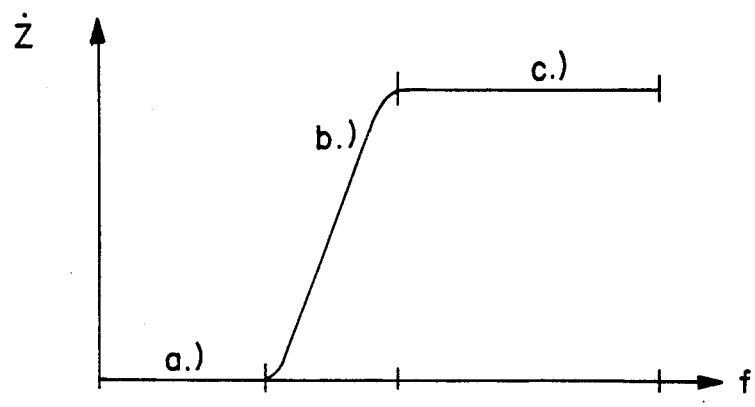

FIG. 3 a) shows in qualitative terms a speed/pulse frequency graph b) shows in quantitative terms, for an illustrative embodiment, a graph corresponding to FIG. 3a).

The diagrammatic representation given in FIG. 1 shows a direct current motor 1, which, in an illustrative embodiment, is an ironless bell-type armature motor of make Faulhaber type 3557 C 012, with a reduction gear 2 and a pinion/rack combination 21 to generate a lifting movement, built onto a microscope 3 having an object stage 31, which can be adjusted in height thereby.

A current supply device 4 generates current pulses which are fed to the motor 1, and is controlled by an angular step transmitter 5, which is connected to a rotatable actuating element 51, e.g. a hand wheel or a crank. The elements 6 and 7 are described hereinbelow, and are one option. This arrangement is essentially determined by the fact that there is straightforward open-loop control, i.e. no feedback is provided. A control loop is created only via the operator by eye and hand. Of course, it is also possible to use an autofocus system to generate a control signal which directly controls the current supply device 4 and thus automates the focusing of the microscope image. The position control system itself (parts 1, 2, 21, 3, 31, 4) does not, however, include any control loop.

An essential particular feature is the utilization of the braking action of motor 1 and gear 2 by electrodynamic and frictional effects in conjunction with the formation of the current pulses by the current supply device 4.

Figure 2A:
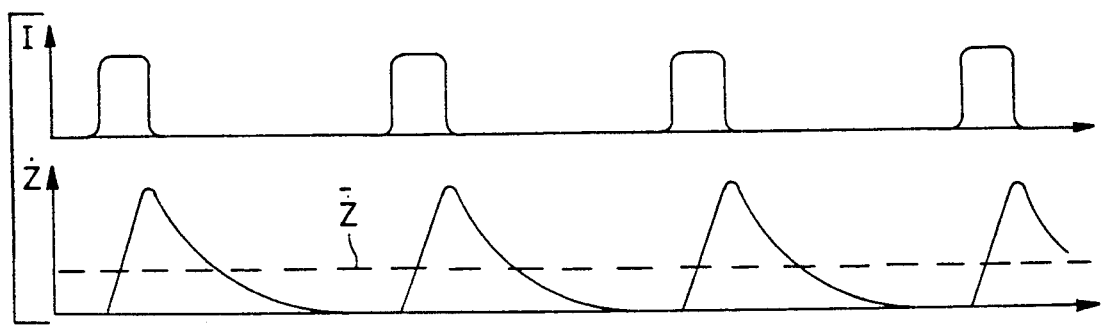
Figure 2B:
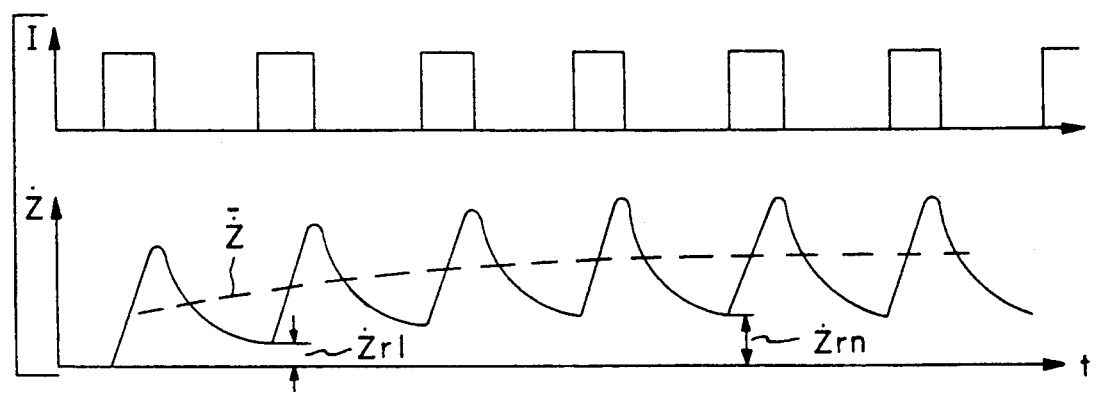
Figure 2C:

In this connection, in FIG. 2 a) to 2 c) the time progression of the current pulses is associated, in qualitative terms, with the time progression of the lifting speed z of the object stage 31 for various pulse repetition frequencies $f_p$.

The form of the current pulses is independent of the pulse repetition frequency $f_p$. Their height is advantageously selected so that the current required to overcome the static friction is exceeded by a multiple.

A rounding of the flanks of the current pulses, e.g. using a capacitor, is advisable especially for the purpose of reducing the noise of the positioning drive.

FIG. 2 a) shows the situation for low pulse frequencies $f_p$.

Motor 1, gear 2, 21 and object stage 31 are accelerated during each individual current pulse and are fully braked again after its end, before a new current pulse follows. The integral over the speed pulse thus gives, for each current pulse, a movement step of size which is specified, although possibly affected by fluctuations. In this manner, a very fine adjustment is possible.

If the pulse repetition frequency $f_p$ exceeds the threshold at which the respectively following current pulse already comes in its turn, before the motor 1 has reached standstill (residual speed $z_{rl} > 0$ [sic]), then the progression sketched in FIG. 2 b) is obtained.

A run-up process extends over a plurality of current pulses, after which process the residual speed $z_{rn}$ upon the initiation of the new current pulse is significantly greater than after a first current pulse. Thus, in this range, the mean speed z increases to a greater extent with the pulse repetition frequency $f_p$ than in the case of FIG. 2 a).

Without any switch-over means and with only one input means, e.g. the handwheel 51, a quick-motion characteristic for positioning over relatively large displacement paths is thus effectively obtained.

In the course of further raising of the pulse repetition frequency $f_p$, the pulse interval disappears and the result is a direct current; the positioning unit then runs, after a brief run-up phase, at maximum speed, as shown in FIG. 2 c).

Figure 3B:
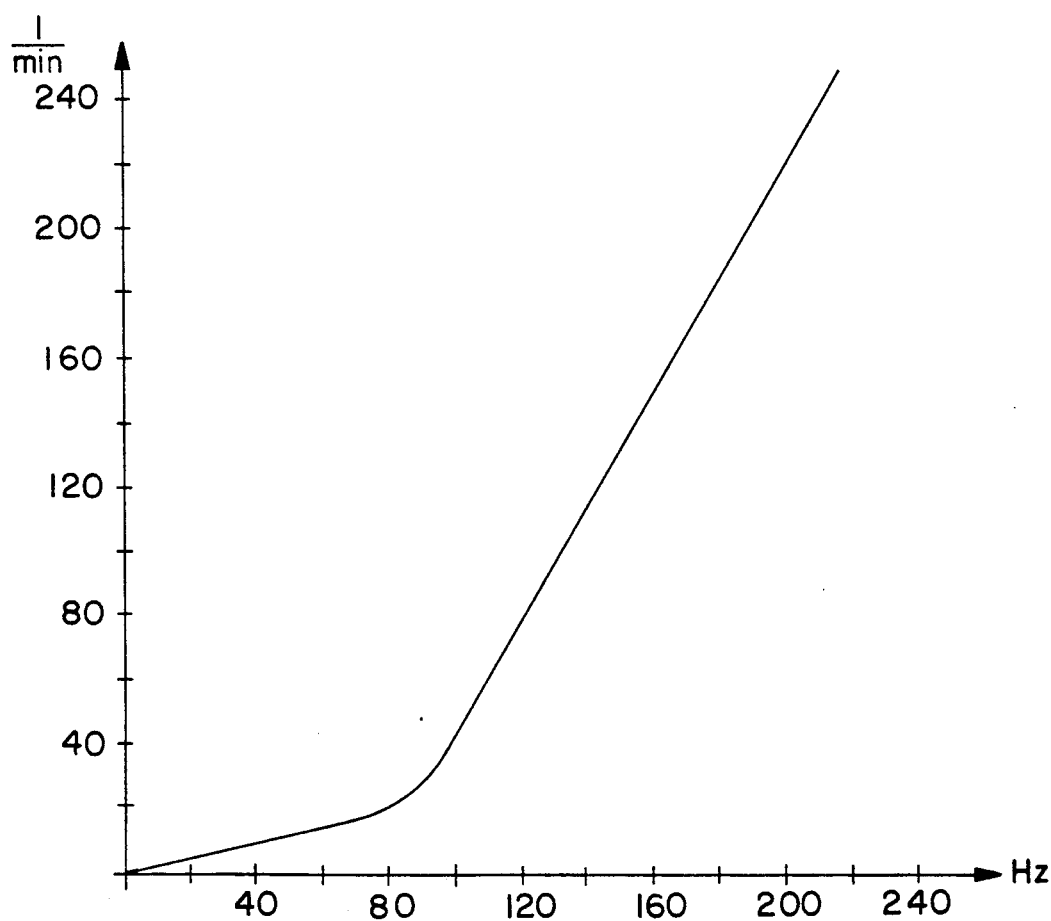

FIG. 3 a) shows, also in qualitative terms, the speed/pulse repetition frequency characteristic z ($f_p$) for the mode of operation which is described according to FIG. 2 a) to 2 c) and which is employed according to the invention.

In the region a), according to FIG. 2 a) and at low frequency $f_p$, the mean speed z is proportional to the frequency $f_p$ with a small factor m.

In this region, it is thus possible to carry out very fine positioning by means of the handwheel 51 or another drive of the current supply device 4.

At a slightly higher rotational speed of the handwheel 51, and thus frequency $f_p$, the system moves into the region b) corresponding to FIG. 2 b) of the steep rise of the characteristic and thus automatically into a type of "quick motion" of the position control system.

In the case of very rapid rotation or frequency, the maximum speed is reached in direct current operation according to FIG. 2 c), as shown in the section c).

In an illustrative embodiment, a bell-type armature direct current motor (1) of make Faulhaber type 3557 C 012 is fed with current pulses having an amplitude of 1.5 A and a duration of less than 1 ms, and acts via a commercially available 250:1 spur wheel reduction gear (2) and a conventional pinion/rack arrangement (21) on the height setting of the object stage (31) of a microscope (3). The smallest strokes of 0.1 μm in the region a) and displacement speeds of 8 mm/s in the upper part of region b) are achieved in this manner.

FIG. 3 b) shows, in addition, a measured speed/pulse repetition frequency $f_p$ characteristic, intended for the readily measurable motor rotational speed n. In the region a) with $f_p$ below 80 Hz, the proportionality factor $m_a$ is equal to 24 rotations per minute per 100 Hz. Each pulse causes 0.4 rotations.

For higher pulse repetition frequencies $f_p$ in the region b), the motor rotational speed increases to a greater extent, and above $f_p = 100$ Hz it is again proportional, with a proportionality factor $m_b$ equal to 200 rotations per minute per 100 Hz, i.e. an increase to eight times the previous level.

The position of the bend in the characteristic can be influenced in design terms by the braking action of the motor/gear unit (1, 2) and also can be adjusted in operation by setting the amplitude and duration of the current pulses of the current supply device 4, whereby at the same time the steepness of the characteristic is altered in all regions.

This can, for example, be utilized in a microscope for the purpose of matching the control characteristic to the depth-of-field ranges of various objectives.

A similar matching is achieved if the proportionality factor between pulse frequency $f_p$ of the current supply device 4 and angular velocity of the actuating element 51 is adjustable, e.g. by means of frequency dividers.

The forward and backward movement required in the case of a drive for linear positioning is achieved with utilization of the characteristic of the direct current motor 1 by polarity reversal, for which purpose a pole reversal device 10 of conventional type is integrated in the current supply device 4, which pole reversal device can be controlled by a rotational direction sensor 52 which is combined in known manner with the angular step transmitter 5.

A simple and inexpensive arrangement for reproducible positioning onto a freely selectable position is obtained if, in an arrangement according to the invention, a potentiometer 6 is disposed along the displacement path, so that, using this potentiometer, a voltage ratio proportional to the displacement path can be tapped off.

A comparator circuit 7 includes a memory into which the value of this voltage ratio is read in. Then, for example, the object stage 31 of the microscope 3 can be lowered from the objectives for manipulations on the object. If the original position is to be run up again, then the comparator circuit 7 forms a clock signal with a frequency which is proportional to the difference between the actual voltage ratio and the stored value. This clock signal controls the current supply device 4.

The characteristic, according to the invention, of the position control system then causes a rapid displacement to reach the vicinity of the selected position and then a slow and reliable approach to the precise position.

It is significant that in this case no particular requirements are imposed with regard to linearity of the potentiometer 6, stability of the voltages, slip or hysteresis of the gear 2, 21 and of the motor 1. Potentiometer 6 and comparator circuit 7 can also fulfill the function of limit switches to limit the displacement path of the object stage 31.

In the case of a microscope with a focus detector, a frequency signal corresponding to the defocusing can be derived from said focus detector and thus the current supply device 4 can be controlled, so that an autofocus system is created with the position control system according to the invention.

What is claimed is:

1. Position control system according to claim 14, wherein said pulse frequency of said current supply device is controlled by an angular step transmitter coupled to a rotatable actuating element such that said pulse repetition frequency is proportional to an angular velocity of said actuating element.

2. Position control system according to claim 14, wherein said current supply device includes a pole reversal device whereby direction of rotation of said direct current motor can be altered by polarity reversal of said current pulses.

3. Position control system according to claim 1, wherein polarity of said current supply device is determined by a direction of rotation of said actuating element.

4. Position control system for controlling linear displacement of an object having a direct current motor and a gear to convert rotary movement into linear movement comprising:

a current supply device for generating current pulses of a pulse frequency having an amplitude and a pulse duration;

a pole reversal device;

a rotatable actuating element coupled with an angular step transmitter and a rotational direction sensor, wherein said pulse frequency of said current supply device is determined by a direction detected by said angular step transmitter and a polarity of said pole reversal device is determined by said rotational direction sensor; and speed determining means for determining a speed of movement of said object as a function of said pulse frequency, such that said speed determining means causes a slow proportional increase of said speed when said pulse frequency is below a threshold value and said speed determining means cause a significantly greater increase of said speed when said pulse frequency is above said threshold.

5. Position control system according to claim 14, wherein when said pulse repetition frequency exceeds a second value said current pulses are superposed on one another to form a constant direct current such that said mean speed of said reduction gear driving said position changes remains constant.

6. Position control system according to claim 14 wherein said current supply device generates square-wave current pulses and capacitors are provided to round said square-wave current pulses.

7. Position control system according to claim 14, wherein said current supply device generates current pulses with an amplitude which is far in excess of a current required to overcome static friction of said direct current motor and said reduction gear (2).

8. Position control system according to claim 14, further comprising means for adjusting amplitude and/or time duration of said current pulses of said current supply device.

9. Position control system according to claim 1, wherein a proportionality factor between said pulse repetition frequency of said current supply device and angular velocity of said actuating element (51) is adjustable.

10. Position control system according to claim 14, wherein said reduction gear and said position changer generate a linear movement such that an individual current pulse causes a movement step smaller than 1 $\mu$m and said speed for pulse repetition frequencies above said threshold exceeds a value of 1 mm/s.

11. Position control system according to claim 14, further comprising a position transmitter and a threshold value switch, for reproducible positioning to a specified position.

12. Position control system according to claim 11, wherein said position changer comprises one of a focusing drive or drive of the object stage in a microscope.

13. Position control system according to claim 12, wherein said focusing drive is an actuating drive in an autofocus control loop.

14. A position control system comprising:
  a direct current motor including means for generating a first braking action;
  a reduction gear driven by said direct current motor including means for generating a second braking action, said reduction gear driving a position changer causing a change in position of a controlled object; and
  a current supply device generating current pulses and supplying said current pulses to said direct current motor, said current supply device including means for adjusting a pulse repetition frequency;
  wherein said first braking action and said second braking action combine such that
    said position changer is braked to a standstill between successive current pulses when said pulse repetition frequency is below a first value such that a mean speed of said reduction gear driving said position changer is substantially proportional to said repetition pulse frequency times a small proportionality factor; and
    said position changer does not come to a standstill between successive current pulses when said pulse repetition frequency is above a threshold value such that said means speed of said reduction gear driving said position changer greatly increases with an increase in said repetition pulse frequency above said threshold.

* * * * *